United States Patent [19]

Jolly

[11] Patent Number: 4,841,809

[45] Date of Patent: Jun. 27, 1989

[54] NUTATING GEAR POSITRACTION DIFFERENTIAL

[75] Inventor: Frank H. Jolly, Arcata, Calif.

[73] Assignee: F. J. Engineering, Inc., Palo Alto, Calif.

[21] Appl. No.: 161,637

[22] PCT Filed: Dec. 21, 1987

[86] PCT No.: PCT/US87/03327

§ 371 Date: Dec. 21, 1987

§ 102(e) Date: Dec. 21, 1987

Related U.S. Application Data

[63] Continuation-in-part of Ser. No. 947,801, Dec. 30, 1986, abandoned.

[51] Int. Cl.⁴ .................... F16H 37/06; F16H 35/04
[52] U.S. Cl. ................................. 74/714; 74/640; 74/650
[58] Field of Search .............. 74/640, 710, 710.5, 74/711, 650, 714

[56] References Cited

U.S. PATENT DOCUMENTS

| | | | |
|---|---|---|---|
| 1,730,183 | 10/1929 | Wildhaber | 74/714 |
| 2,700,310 | 1/1955 | Viebrock et al. | 74/650 |
| 3,532,005 | 10/1970 | Bremner, Jr. et al. | 74/640 |
| 3,977,275 | 8/1976 | Kiesewetter et al. | 74/800 |
| 4,291,591 | 9/1981 | Ross | 74/650 |
| 4,449,442 | 5/1984 | Ebbing et al. | 91/44 |
| 4,665,769 | 5/1987 | Parsons | 74/714 |

*Primary Examiner*—Dwight G. Diehl
*Attorney, Agent, or Firm*—Limbach, Limbach & Sutton

[57] ABSTRACT

A nutating gear positraction differential composed of two cam operated nutating gear sets, wherein the axles or shafts are connected to the cams of their respective gear sets; the cam operated gear sets transmit motion only from the cams to the gears and not in reverse. This forces the gear sets to lock up as soon as one cam loses its load.

4 Claims, 4 Drawing Sheets

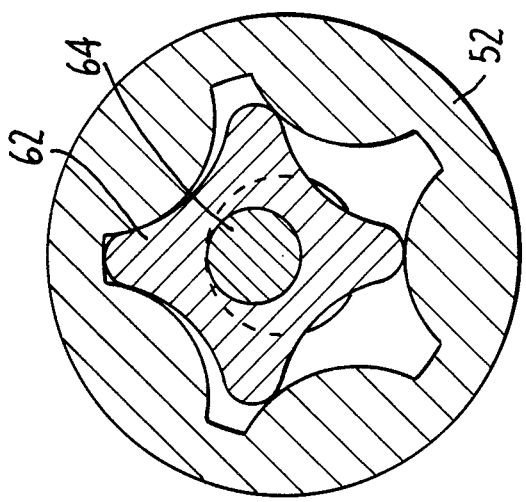
FIG.-4.-
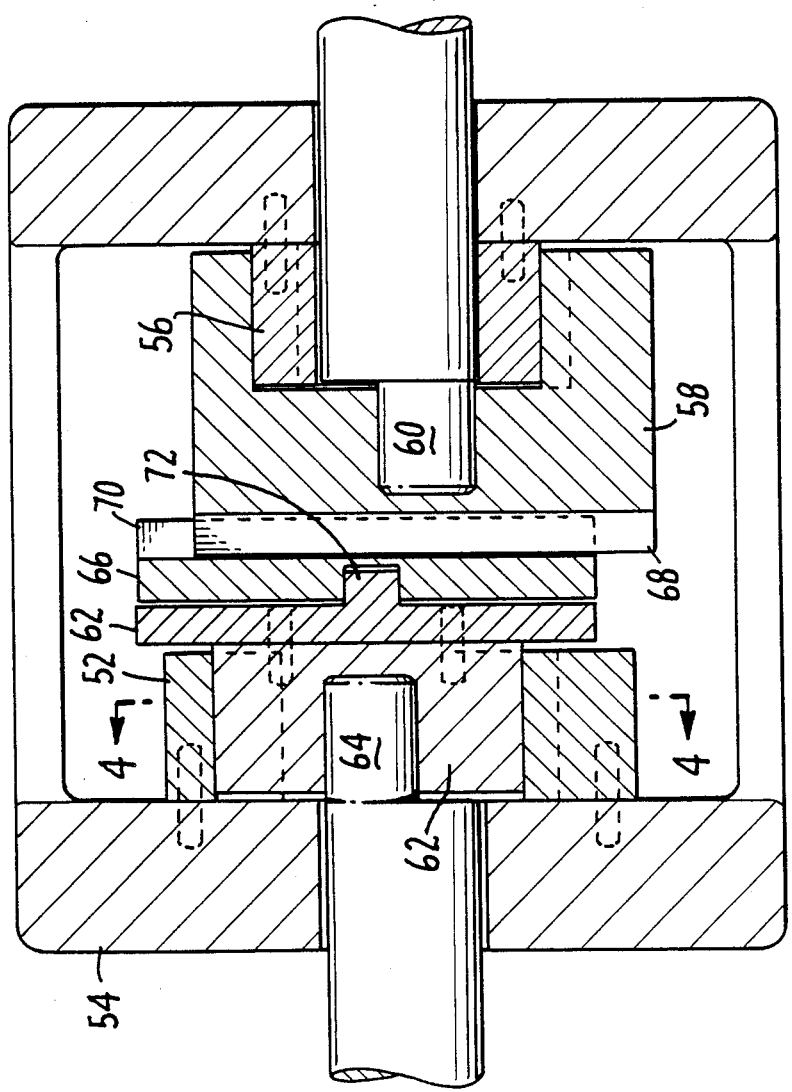
FIG.-3.-
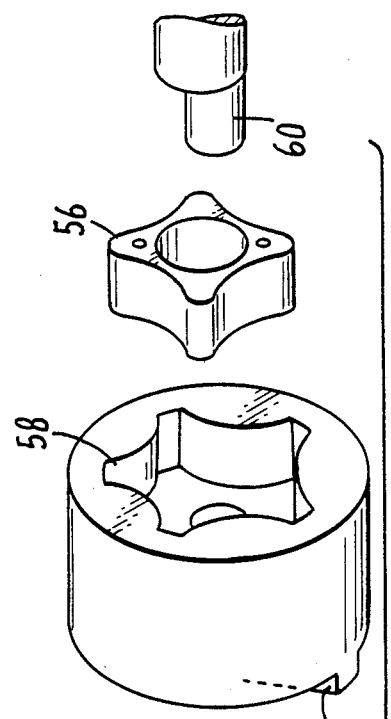
FIG.-5.-

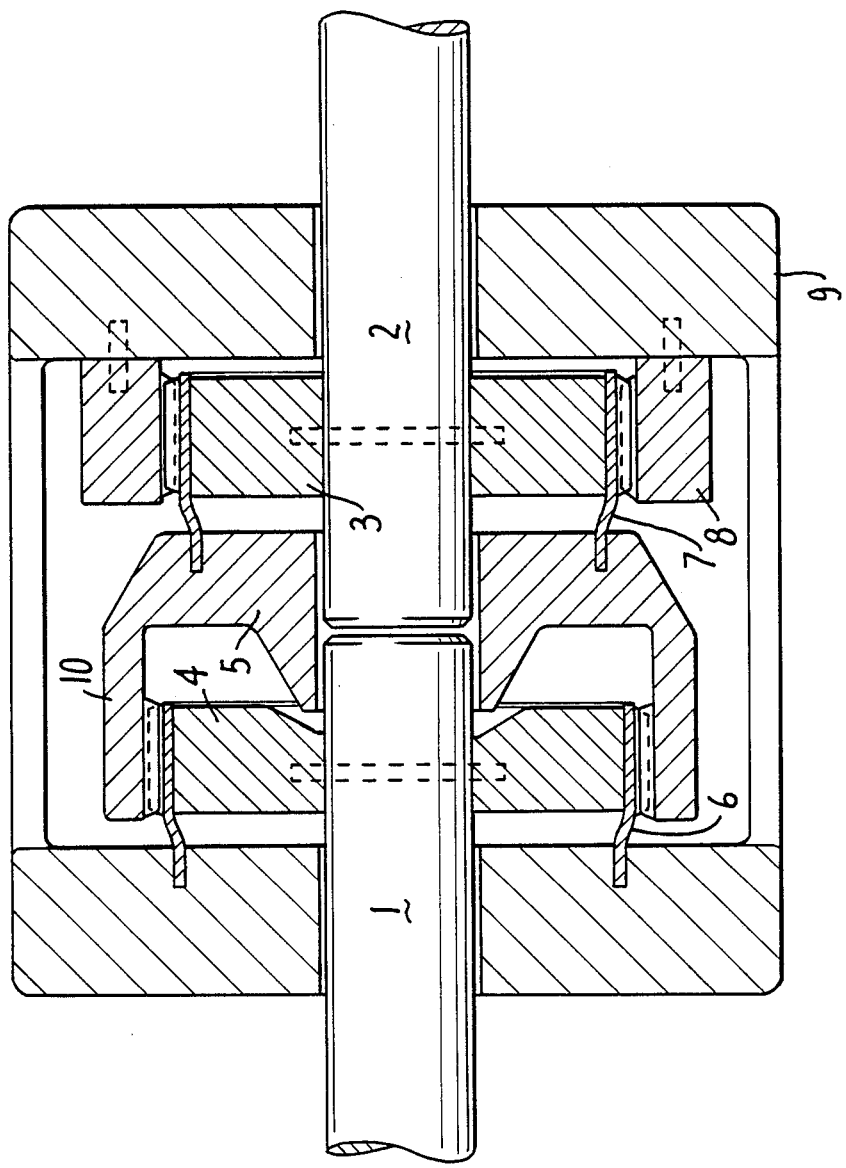

NUTATING GEAR POSITRACTION DIFFERENTIAL

RELATED APPLICATIONS

This application is a continuation in part of copending application Ser. No. 947,801, filed Dec. 30, 1986, which is now abandoned.

BACKGROUND OF INVENTION

Many structures are known for limited slip differentials, but they are complex and expensive devices. The following prior U.S. patents have been found in searches on the subject, but none provide a simple and inexpensive limited slip differential structure: U.S. Pat. Nos. 1,355,170; 1,483,606; 1,505,570; 1,515,916; 1,934,721; 2,859,641; 2,923,174; 3,548,683; 3,581,597; 3,686,976; 3,700,082; 3,732,750; 4,104,931; 4,400,996; 4,498,355; 4,507,984; 4,524,640; 4,554,845; 4,598,609 and 4,640,143.

SUMMARY OF THE INVENTION

This invention is a positraction or non-slip differential that allows two shafts or wheels to rotate at different speeds (one faster and the other slower than the differential case). The difference in speed for each shaft with respect to the case is allowed only when the wheel or shaft needs to rotate more slowly or faster than the case speed. The differential is constructed of two cam operated nutating gear sets. Each axle or shaft is connected to the cams of the gear sets respectively. The differential will not allow one wheel to spin and steal torque from the other because each cam operated nutating gear set is asymmetric in transmitting torque; with the cam attached to the drive shaft and the gear connected to the case, torque from the shaft is able to rotate the gear with respect to the housing more easily than torque from the gear can cause rotation of the cam. In short, if a wheel loses traction its cam will immediately rotate at case speed. When one cam rotates at case speed with one-way drive through the cam-gear sets, the other cam must also rotate at case speed because torque can not flow backwards through the cam operated gear set.

The gear-cam sets may be designed with limited slip biasing, that is, partial ability to drive in both directions through each gear-cam set so that upon loss of load on one shaft, the entire torque of the housing is not transmitted to the remaining driven shaft thereby doubling the torque on the remaining driven shaft. This may be accomplished by differential positive torque transmission in the two directions through the gear-cam set by proper selection of gear ratio and cam ratio in relation to the frictional resistance of the gear-cam set.

The cam operated gear sets may use edge nutating gears, face mutating gears or elliptical nutation.

BRIEF DESCRIPTION OF THE SEVERAL VIEWS OF THE DRAWING

FIG. 3 is a longitudinal sectional view of a differential of this invention using edge nutating gears;

FIG. 4 is a cross-sectional view of a the structure of FIG. 3 taken on the plane indicated at 4—4 in FIG. 3; and FIG. 5 is an exploded view of the structure of FIG. 3.

FIG. 6 shows a possible method of using two harmonic drives (elliptical cam operated gear sets) to construct a limited slip differential. The inner gear of a harmonic drive has the fewer number of teeth of the two gears. The inner gear is a flexible gear made of spring steel or other strong flexible media. The outer gear is a rigid internally-toothed ring gear.

DETAILED DESCRIPTION

This invention is an improvement in the design of anti-spin differentials wherein two cam operated gear sets are used to transmit differential torque from the cams, but not in the reverse direction. The specific types of gear trains used are the face nutators, edge nutators, and the harmonic drives.

Figure 1:
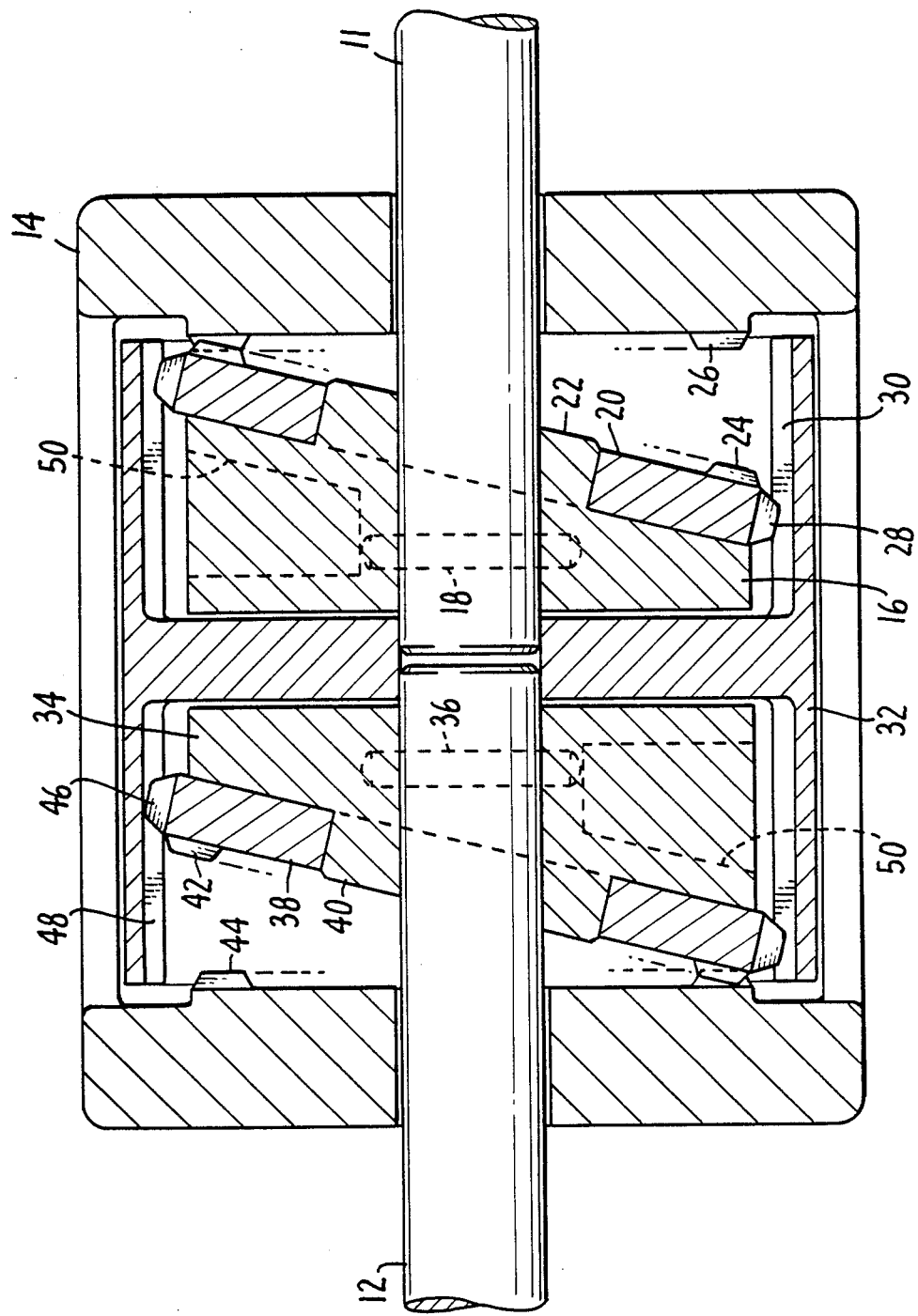
FIG. 1 is a longitudinal sectional view of one form of my invention using face nutating gears.
Figure 2:
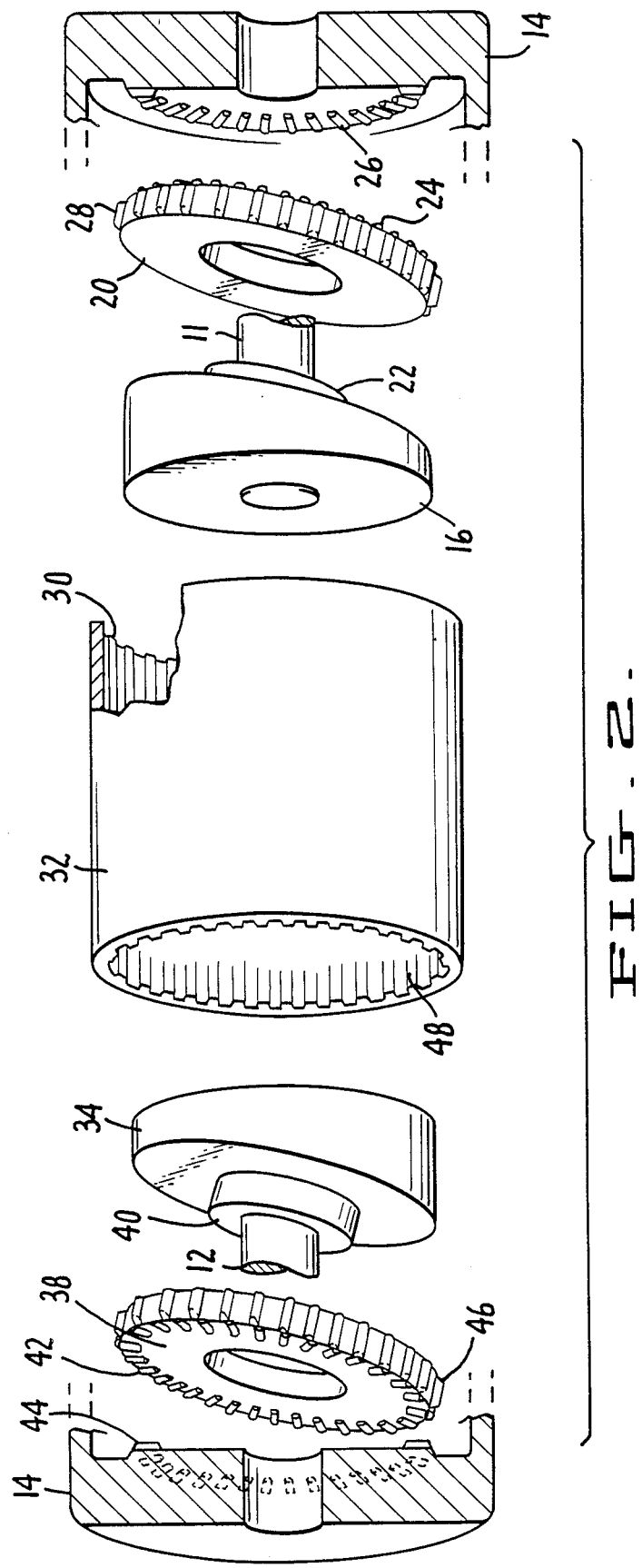
FIG. 2 is an exploded view of the differential of FIG. 1.

Referring now in detail to FIGS. 1 and 2, a pair of shafts 11 and 12 are rotatably mounted in a differential housing 14 which may be rotated about the axis of the shafts by any suitable means such as a bevel gear. A pair of nutating drive trains connect the shafts to the housing.

The drive train for the shaft 11 includes a cam 16 connected to the shaft 11 by a pin 18, a nutating gear 20 mounted for rotation on a boss 22 on the cam 16 and carrying a set of face teeth 24 engaging a set of face teeth 26 on the inside of the case 14 with the nutating gear 20 also carrying a set of peripheral teeth 28 which engage a set of ring gear teeth 30 on the inside of a carrier 32.

The drive train for the shaft 12 includes a cam 34 connected to the shaft 12 by a pin 36, a nutating gear 38 mounted for rotation on a boss 40 on the cam 34 and carrying a set of face teeth 42 engaging a set of face teeth 44 on the inside of the case 14 with the nutating gear 38 also carrying a set of peripheral teeth 46 which engage a set of ring gear teeth 48 on the inside of the carrier 32.

Each of the cams 16 and 34 contains a recess 50 shaped to counterbalance each cam-gear set.

The teeth 28, 30, 46 and 48 function as a spline connection between the gears 20 and 38. The nutating gears 20 and 38 both have 30 teeth in the sets 24 and 42, but the teeth in the sets 26 and 44 on the inside of the case are different with 31 teeth in set 26 and 29 shaft in set 44. As a result, one revolution of the shaft 11 with respect to the case 14 will cause the nutating gear 20 to lag one thirtieth of a revolution with respect to the shaft 11, and one revolution of shaft 12 with respect to case 14 will cause the nutating gear 38 to lead one-thirtieth of a revolution with respect to the shaft 12.

With the nutating gears selected in this way, rotation of the shafts 11 and 12 causes equal rotation of the nutating gears 20 and 28, and the gears 20 and 38 rotate in the same direction with respect to the case 14 when the shafts 11 and 12 are rotating in opposite directions with respect to each other producing differential action. The rotation of the two shafts must be equal and opposite, because the two nutating gears 20 and 38 are forced to rotate in the same direction at the same speed by the spline connection through teeth 28, 30, 46 and 48 and rigid carrier 32.

If the load is removed from one shaft, for instance shaft 11, while the case 14 is driven, the resistance of the load on the other shaft 12 will try to drive the differential to spin shaft 11 in the opposite direction, but this counter-spinning will not happen because nutating gear 20, which is driven by teeth 30 cannot drive the shaft 11 to rotate with respect to the case 14 through the one to thirty speed-up drive of the gears 24 and 26 with the frictional drag of the interface between the cam 16 and the nutating gear 20.

It will be noted that it is possible to select the cam angle for cam 34 to exactly compensate for the difference in the circumferences of the sets of teeth 42 and 44, though this is not the case for the sets of teeth 24 and 26. Thus, the circumference of the set of teeth 44 is 29 times the pitch of the teeth, and the circumference of the set 42 is 30 times the pitch. The diameters of the two sets are the same, projected onto a plane perpendicular to the axis of shaft 12 if the cam angle is arc cosine 29/30, that is 14.8 degrees. This permits the boss 40 to be concentric with the axis of shaft 12 in the plane of the teeth 42. On the other hand the center of boss 22 is off-set from the axis of shaft 11 toward the side where teeth 24 and 26 engage.

If a wheel on either shaft 11 or 12 loses traction or comes off the driving surface, its gear train will lock up. If cam 16 stops relative to gear 20, gear 20 must stop relative to gear 26; no motion of either wheel can occur relative to case 14 and the entire differential will move as a unit; this characteristic is referred to as positraction.

If a cam is driving a gear of X+ Y teeth meshed to a gear of X teeth, the driven gear will move in the same rotational direction as the cam. If a cam is driving a gear of X teeth meshed to a gear of X+ Y teeth, the cammed gear of X teeth will move in the reversed rotation direction from the cam.

X can be any number of teeth. Y can be any number of teeth. If X is chosen to equal 10 and Y is chosen to equal 1, then the X gear has 10 teeth and the X+ Y gear will have 11 teeth.

Cross mixing gears of different numbers of teeth allows shaft 11 to move in the reversed rotational direction relative to shaft 12.

Referring to FIGS. 3-5, a differential of the edge nutating type is shown. This figure illustrates a four to five tooth nutator, but any number of gear teeth can be used. Gear 52 is affixed rigidly to case 54; gear 52 has X+ Y teeth (in this example, five teeth). Gear 56 is affixed rigidly to case 54; gear 56 has X teeth (in this drawing, four teeth).

Gera 58 is cammed relative to gear 56 by axle cam 60; gear 58 in this example has five teeth. Gear 62 is cammed relative to gear 52 by axle cam 64; gear 62 in this example has four teeth.

Plate 66 is a cross-connector. Plate 66 has two grooves cut on opposite sides, so that one groove is perpendicular to the other groove. A tongue 68 on gear 58 slides in a groove 70 in plate 66. A tongue 72 on gear 62 slides in the opposite groove on plate 66.

Case 54 can be driven by a spur gear, a ring gear, a sprocket, or other suitable means. If axle cam 64 is retarded or slowed down relative to case 54, axle cam 64 will move gear 62 relative to gear 52. Gear 62 will rotate in reverse direction to axle cam 64. Gear 62 will rotate plate 66 by turning and sliding simultaneously in its groove. Plate 66 will move gear 58 relative to gear 56 by turning and sliding in the groove with gear 58. Gear 58 will allow axle cam 60 to move opposite axle cam 64.

Axle cam 60 will then turn in a forward direction and rotate faster than case 54.

If axle cam 60 loses its input differential torque, axle cam 60 will not rotate and gear 58 will not rotate relative to axle cam 60. Gear 58 will not rotate relative to gear 56, and the differential will lock up and work as a limited slip differential.

FIG. 6 shows a differential of the harmonic drive type. Gear 7 is a flexible gear; gear 7 has X teeth. Gear 7 is connected to cross-connector 5. Gear 6 is a flexible gear; gear 6 has X teeth. Gear 6 is connected to case 9.

Gear 10 is a rigid internal gear; gear 10 has X+ Y teeth. Gear 10 is connected to cross-connector 5. Gear 8 is a rigid internal gear; gear 8 is attached rigidly to case 9; gear 8 has X+ Y teeth.

Axle 2 is affixed to elliptical cam 3. Axle 1 is affixed to elliptical cam 4. Cam 3 cams flexible gear 7 around relative to gear 8. Gear 7 rotates opposite in rotational direction from cam 3. Gear 7 rotates cross-connector 5. Cross-connector 5 rotates gear 10. Gear 10 has more teeth than gear 6. Gear 10 allows cam 4 to rotate in the same direction as gear 10. Cam 4 rotates opposite cam 3. Cam 4 and axle 1 rotate faster than case 9 allowing cam 3 and axle 2 to rotate slower than case 9.

If either cam 3 or cam 4 lose input direction relative to case 9, the differential locks up and rotates as a unit.

These differentials can be constructed by using gear sets from any of the three types of nutating gears with a second gear set of the same or different types of nutating gears. Example: a face nutating gear set can be connected with a modified cross-connector to an edge nutating gear set to form a limited slip differential.

A further modification can be made where the two nutating gear sets used are identical in configuration. That is, if the nutated member on both sides is the gear with the smaller number of teeth or the larger number of teeth respectively, a reversing unit is placed between the nutating halves to form a differential.

What is claimed is:

1. A limited slip differential comprising:
   a driving member,
   two driven shafts,
   a pair of nutating drive trains one connecting the driving member to each driven shaft, each drive train having an input gear attached to the driving member, a cam connected to the driven shaft and a nutating gear connected between the input gear and the cam, each of the nutating drive trains having a first (larger) gear with a larger number of teeth and a second (smaller) gear with a few number of teeth with the first (large) gear of one drive train nutating and the second (small) gear of the other driving train nutating, and
   connecting means interconnecting the nutating gears of the drive trains for permitting the nutating gears to nutate with respect to each other when the shafts rotate in opposite directions.

2. The differential of claim 1 in which the two drive trains are face nutating cam operated gear sets.

3. The differential of claim 1 in which the two drive trains are edge nutating cam operated gear sets.

4. The differential of claim 1 in which the two drive trains are elliptical cam operated gear sets.

* * * * *

UNITED STATES PATENT AND TRADEMARK OFFICE
CERTIFICATE OF CORRECTION

PATENT NO. : 4,841,809

DATED : June 27, 1989

INVENTOR(S) : Frank H. Jolly

It is certified that error appears in the above - identified patent and that said Letters Patent is hereby corrected as shown below:

Column 2, Line 54, "28" should be --38--.

Column 3, Line 46, "Gera" should be --Gear--.

Signed and Sealed this

Seventh Day of November, 1989

Attest:

JEFFREY M. SAMUELS

*Attesting Officer*   *Acting Commissioner of Patents and Trademarks*